United States Patent
Takahashi et al.

(10) Patent No.: US 9,793,801 B2
(45) Date of Patent: Oct. 17, 2017

(54) SEMICONDUCTOR DEVICE AND DISPLAY DEVICE

(75) Inventors: Kei Takahashi, Kanagawa (JP); Yoshiaki Ito, Tokyo (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 671 days.

(21) Appl. No.: 13/110,303

(22) Filed: May 18, 2011

(65) Prior Publication Data

US 2011/0285426 A1 Nov. 24, 2011

(30) Foreign Application Priority Data

May 21, 2010 (JP) .................................. 2010-116934

(51) Int. Cl.
- *H02M 3/158* (2006.01)
- *H02M 3/157* (2006.01)
- *H02M 1/00* (2006.01)

(52) U.S. Cl.
CPC .......... *H02M 3/158* (2013.01); *H02M 3/157* (2013.01); *H02M 2001/0048* (2013.01); *Y02B 70/1491* (2013.01)

(58) Field of Classification Search
None
See application file for complete search history.

(56) References Cited

U.S. PATENT DOCUMENTS

| | | |
|---|---|---|
| 4,769,753 A | 9/1988 | Knudson et al. |
| 4,914,375 A | 4/1990 | Hatanaka |

(Continued)

FOREIGN PATENT DOCUMENTS

| | | |
|---|---|---|
| CN | 101728424 | 6/2010 |
| EP | 1737044 A | 12/2006 |

(Continued)

OTHER PUBLICATIONS

Fortunato.E et al., "Wide-Bandgap High-Mobility ZnO Thin-Film Transistors Produced At Room Temperature,", Appl. Phys. Lett. (Applied Physics Letters), Sep. 27, 2004, vol. 85, No. 13, pp. 2541-2543.

(Continued)

*Primary Examiner* — Jennifer Mehmood
*Assistant Examiner* — Parul Gupta
(74) *Attorney, Agent, or Firm* — Robinson Intellectual Property Law Office; Eric J. Robinson

(57) ABSTRACT

An object is to reduce power consumption of a semiconductor device including a DC-DC converter circuit. The semiconductor device includes a DC-DC converter circuit and a microprocessor. The DC-DC converter circuit includes a conversion circuit including an inductor and a transistor, and a control circuit including a comparison circuit and a logic circuit. In the control circuit, the comparison circuit compares an output of the conversion circuit and a reference value, and the logic circuit performs an arithmetic operation between an output of the comparison circuit and a clock signal of the microprocessor. In the conversion circuit, the transistor controls a current flowing through the inductor in accordance with an output of the logic circuit, and the output of the conversion circuit is generated in accordance with the current flowing through the inductor.

14 Claims, 7 Drawing Sheets

(56) References Cited

U.S. PATENT DOCUMENTS

| | | | |
|---|---|---|---|
| 5,727,193 A | 3/1998 | Takeuchi | |
| 5,731,856 A | 3/1998 | Kim et al. | |
| 5,744,864 A | 4/1998 | Cillessen et al. | |
| 6,294,274 B1 | 9/2001 | Kawazoe et al. | |
| 6,563,174 B2 | 5/2003 | Kawasaki et al. | |
| 6,661,208 B2 * | 12/2003 | Rutter et al. | 323/224 |
| 6,724,156 B2 | 4/2004 | Fregoso | |
| 6,727,522 B1 | 4/2004 | Kawasaki et al. | |
| 6,940,482 B2 | 9/2005 | Ishii et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,109,692 B1 | 9/2006 | Wu et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,586,294 B2 * | 9/2009 | Endo | H02M 3/1588 323/222 |
| 7,674,650 B2 | 3/2010 | Akimoto et al. | |
| 7,714,562 B2 | 5/2010 | Oswald et al. | |
| 7,732,819 B2 | 6/2010 | Akimoto et al. | |
| 7,843,179 B2 | 11/2010 | Hasegawa et al. | |
| 8,184,459 B2 | 5/2012 | Fujii | |
| 8,502,417 B2 | 8/2013 | Noda | |
| 2001/0046027 A1 | 11/2001 | Tai et al. | |
| 2002/0056838 A1 | 5/2002 | Ogawa | |
| 2002/0060560 A1 | 5/2002 | Umemoto | |
| 2002/0132454 A1 | 9/2002 | Ohtsu et al. | |
| 2002/0185994 A1 | 12/2002 | Kanouda et al. | |
| 2003/0043090 A1 | 3/2003 | Yazawa et al. | |
| 2003/0160744 A1 | 8/2003 | Yoshida et al. | |
| 2003/0189401 A1 | 10/2003 | Kido et al. | |
| 2003/0197494 A1 | 10/2003 | Kanouda et al. | |
| 2003/0218222 A1 | 11/2003 | Wager et al. | |
| 2004/0004470 A1 | 1/2004 | Yoshida et al. | |
| 2004/0038446 A1 | 2/2004 | Takeda et al. | |
| 2004/0066179 A1 | 4/2004 | Wu et al. | |
| 2004/0080501 A1 | 4/2004 | Koyama | |
| 2004/0127038 A1 | 7/2004 | Carcia et al. | |
| 2004/0135555 A1 * | 7/2004 | Danioni | H02M 3/156 323/222 |
| 2005/0012698 A1 | 1/2005 | Takahashi | |
| 2005/0017302 A1 | 1/2005 | Hoffman | |
| 2005/0057238 A1 * | 3/2005 | Yoshida | H02M 3/156 323/282 |
| 2005/0110719 A1 | 5/2005 | Satoh et al. | |
| 2005/0116655 A1 | 6/2005 | Yazawa | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0044174 A1 | 3/2006 | Bayer | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0239071 A1 * | 10/2006 | Ohta | G11C 11/5671 365/185.02 |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0029977 A1 | 2/2007 | Asada | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0111531 A1 | 5/2008 | Hasegawa et al. | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0009505 A1 | 1/2009 | Koyama | |
| 2009/0027086 A1 | 1/2009 | Trifonov | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0212826 A1 | 8/2009 | Mizunaga | |
| 2009/0278122 A1 | 11/2009 | Hosono et al. | |
| 2009/0280600 A1 | 11/2009 | Hosono et al. | |
| 2009/0309561 A1 | 12/2009 | Chen et al. | |
| 2010/0065844 A1 | 3/2010 | Tokunaga | |
| 2010/0092800 A1 | 4/2010 | Itagaki et al. | |
| 2010/0102311 A1 | 4/2010 | Ito et al. | |
| 2010/0109002 A1 | 5/2010 | Itagaki et al. | |
| 2010/0270950 A1 | 10/2010 | Tamegai et al. | |
| 2010/0296355 A1 * | 11/2010 | Mochida | G11C 7/1039 365/205 |
| 2011/0006694 A9 | 1/2011 | Tamegai et al. | |
| 2011/0133706 A1 | 6/2011 | Takahashi et al. | |
| 2011/0285372 A1 | 11/2011 | Takahashi et al. | |

FOREIGN PATENT DOCUMENTS

| | | |
|---|---|---|
| EP | 2226847 A | 9/2010 |
| JP | 58086868 | 5/1983 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |

(56) References Cited

FOREIGN PATENT DOCUMENTS

| | | |
|---|---|---|
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-131633 A | 5/2003 |
| JP | 2004-103957 A | 4/2004 |
| JP | 2004-118147 A | 4/2004 |
| JP | 2004-273614 A | 9/2004 |
| JP | 2004-273732 A | 9/2004 |
| JP | 2006-238062 A | 9/2006 |
| JP | 2008-191375 A | 8/2008 |
| JP | 2009-258809 A | 11/2009 |
| JP | 2010-103360 A | 5/2010 |
| KR | 2010-0045912 A | 5/2010 |
| WO | WO-2004/114391 | 12/2004 |
| WO | WO-2009/125866 | 10/2009 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using Cg-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTS,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the $In_2O_3$—$Ga_2ZnO_4$—ZnO system at 1350° C.,", Journal of Solid State Chemistry, Aug. 1, 1991, vol. 93, No. 2, pp. 298-315.

Kimizuka.N. et al., "Syntheses and Single-Crystal Data of Homologous Compounds, $In_2O_3(ZnO)m$ (m=3, 4, and 5), $InGaO_3(ZnO)_3$, and $Ga_2O_3(ZnO)m$ (m=7, 8, 9, and 16) in the $In_2O_3$—$ZnGa_2O_4$—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters) , Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White TANDEM OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ As a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTS,", IDW '09: Proceedings of the 16th International Display Workshops, 2009, pp. 689-692.

Park.J et al., "Amorphous Indium-Gallium-Zinc Oxide TFTS and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

(56) References Cited

OTHER PUBLICATIONS

Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.

Osada.T et al., "Development of Driver-Integrated Panel Using Amorphous In—Ga—Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTS) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTS With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 1, 2002, vol. 1, pp. 64-68.

Kimizuka.N. et al., "SPINEL,YbFe2O4, and Yb2Fe3O7 Types of Structures for Compounds in the In2O3 and Sc2O3-A2O3-BO Systems [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

Zheng.C et al., "10.5 A 10MHz 92.1%-Efficiency Green-Mode Automatic Reconfigurable Switching Converter with Adaptively Compensated Single-Bound Hystersis Control", ISSCC 2010 (Digest of Technical Papers. IEEE International Solid-State Circuits Conference), Feb. 9, 2010, pp. 204-206.

Yamashita K., "Intensive analog seminar Session 6—High Speed Hysteretic Control—Leaped to center stage of power supply control method", Nikkei Electronics, Jun. 15, 2009, pp. 77-86.

Taiwanese Office Action (Application No. 100117582) Dated Apr. 20, 2015.

International Search Report (Application No. PCT/JP2011/061594) Dated Aug. 23, 2011.

Written Opinion (Application No. PCT/JP2011/061594) Dated Aug. 23, 2011.

* cited by examiner

SEMICONDUCTOR DEVICE AND DISPLAY DEVICE

TECHNICAL FIELD

The technical field relates to a semiconductor device and a method for driving the semiconductor device, and a display device and a method for driving the display device.

BACKGROUND ART

In recent years, a circuit that converts a given DC voltage into another DC voltage (also referred to as a DC-DC converter circuit or a DC to DC converter) is used in a variety of electronic devices when a stable power supply voltage is generated from a voltage with large fluctuation or when a plurality of different power supply voltages are needed, for example.

An example of the DC-DC converter circuit is a non-isolated DC-DC converter circuit formed using a coil, a diode, and a transistor, for example (e.g., Patent Document 1). The non-isolated DC-DC converter circuit has advantages of a small circuit area and low production cost.

REFERENCE

Patent Document 1: Japanese Published Patent Application: No. S58-086868

DISCLOSURE OF INVENTION

An object is to provide a novel circuit structure or a novel driving method for a semiconductor device including a DC-DC converter circuit. Another object is to reduce power consumption of a DC-DC converter circuit. Another object is to increase the power conversion efficiency of a DC-DC converter circuit.

A semiconductor device includes a DC-DC converter circuit and a microprocessor. The DC-DC converter circuit is controlled using a clock signal of the microprocessor and converts an input voltage (also referred to as an input signal) into an output voltage (also referred to as an output signal). Note that the input and output of the DC-DC converter circuit may alternatively be current or the like.

According to one embodiment of the present invention, a semiconductor device includes a DC-DC converter circuit and a microprocessor. The DC-DC converter circuit includes a conversion circuit including an inductor and a transistor, and a control circuit including a comparison circuit and a logic circuit. In the control circuit, the comparison circuit compares an output of the conversion circuit and a reference value (also referred to as a reference voltage or a reference signal), and the logic circuit performs arithmetic operation of an output of the comparison circuit and a clock signal of the microprocessor. In the conversion circuit, the transistor controls a current flowing through the inductor in accordance with an output of the logic circuit, and the output of the conversion circuit is generated in accordance with the current flowing through the inductor.

According to another embodiment of the present invention, a display device includes a DC-DC converter circuit, a microprocessor, and a display portion including a pixel. The DC-DC converter circuit includes a conversion circuit including an inductor and a transistor, and a control circuit including a comparison circuit and a logic circuit. In the control circuit, the comparison circuit compares an output of the conversion circuit and a reference value, and the logic circuit performs arithmetic operation of an output of the comparison circuit and a clock signal of the microprocessor. In the conversion circuit, the transistor controls a current flowing through the inductor in accordance with an output of the logic circuit, and the output of the conversion circuit is generated in accordance with the current flowing through the inductor. In the display portion, the pixel is driven in accordance with the output of the conversion circuit.

According to another embodiment of the present invention, a display device includes a DC-DC converter circuit, a microprocessor, and a display portion including a pixel. The DC-DC converter circuit includes a conversion circuit including an inductor and a transistor, and a control circuit including a comparison circuit, an amplification circuit, and a logic circuit. In the control circuit, one of a first operation and a second operation is performed. In the first operation, the comparison circuit compares an output of the conversion circuit and a first reference value, and the logic circuit performs arithmetic operation of an output of the comparison circuit and a clock signal of the microprocessor. In the second operation, the amplification circuit amplifies a difference between the output of the conversion circuit and a second reference value, and the comparison circuit compares an output of the amplification circuit and a triangle wave. In the conversion circuit, the transistor controls a current flowing through the inductor in accordance with an output of the logic circuit through the first operation or an output of the comparison circuit through the second operation, and the output of the conversion circuit is generated in accordance with the current flowing through the inductor. In the display portion, one of first driving and second driving is performed. A video signal is written into the pixel at intervals of from 1 to 600 seconds in the first driving, and at intervals of $\frac{1}{60}$ seconds or less in the second driving. In the display portion, the pixel is driven in accordance with the output of the conversion circuit through the first operation when the first driving is performed, and the pixel is driven in accordance with the output of the conversion circuit through the second operation when the second driving is performed.

In a semiconductor device or a display device according to one embodiment of the present invention, power consumption of a DC-DC converter circuit can be reduced. Moreover, the power conversion efficiency of the DC-DC converter circuit can be increased.

BEST MODE FOR CARRYING OUT THE INVENTION

Figure 1A:
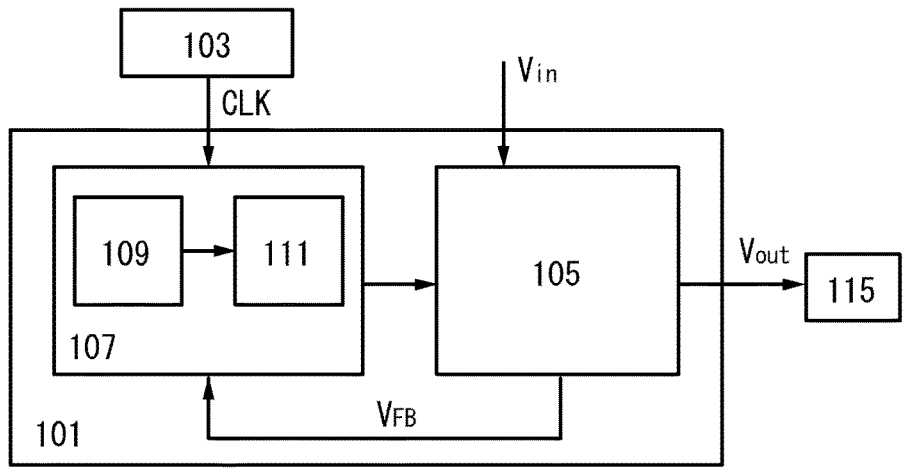
FIGS. 1A to 1D illustrate an example of a semiconductor device.

Embodiments will be described below with reference to the accompanying drawings. Note that the following embodiments can be implemented in many different modes, and it is apparent to those skilled in the art that modes and details can be modified in various ways without departing from the spirit and scope of the present invention. Therefore, the present invention is not construed as being limited to the description of the embodiments. In the drawings for explaining the embodiments, the same portions or portions having similar functions are denoted by the same reference numerals, and description of such portions is not repeated.

Embodiment 1

In this embodiment, examples of a structure and a driving method of a semiconductor device will be described.

FIG. 1A is an example of a block diagram of a semiconductor device including a DC-DC converter circuit.

The semiconductor device includes a DC-DC converter circuit 101 and a microprocessor 103. The DC-DC converter circuit 101 includes a conversion circuit 105 and a control circuit 107. The DC-DC converter circuit 101 generates an output voltage $V_{out}$ by conversion of an input voltage $V_{in}$.

Figure 1B:
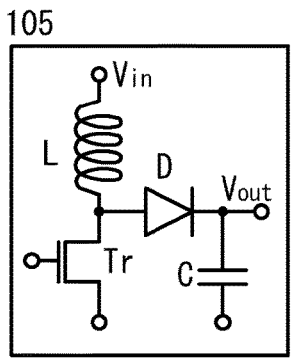
Figure 1C:
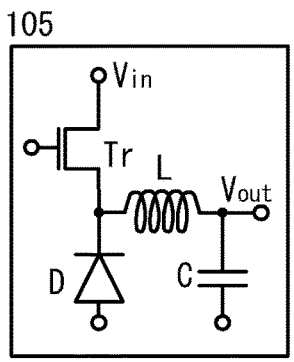

FIGS. 1B and 1C each illustrate an example of the conversion circuit 105. FIG. 1B illustrates a step-up converter ($V_{in}<V_{out}$), and FIG. 1C illustrates a step-down converter ($V_{in}>V_{out}$).

The conversion circuit 105 at least includes a transistor Tr and an inductor L.

The transistor Tr functions as a switch element and controls current flowing through the inductor L by being switched on (conduction state) and off (non-conduction state). Note that the state of the transistor Tr is determined by a pulse signal generated in the control circuit 107.

The inductor L generates electromotive force depending on the current flowing therethrough, and generates the output voltage $V_{out}$ of the conversion circuit 105 (also called an output voltage of the DC-DC converter circuit 101). The current value is determined by the level of the input voltage $V_{in}$ or the like. In such a manner, the input voltage $V_{in}$ can be converted into the output voltage $V_{out}$. In this embodiment, the inductor L is a coil, for example.

Next, a specific structure and operation of the conversion circuit 105 will be described, using the circuit in FIG. 1B.

The conversion circuit 105 in FIG. 1B includes the transistor Tr, the inductor L, a diode D, and a capacitor C. A gate of the transistor Tr is electrically connected to the control circuit 107. One of a source and a drain of the transistor Tr is electrically connected to one terminal of the inductor L and an anode of the diode D. The other terminal of the inductor L is electrically connected to an input terminal A cathode of the diode D is electrically connected to one terminal of the capacitor C and an output terminal. The other of the source and the drain of the transistor Tr and the other terminal of the capacitor C are electrically connected to a wiring to which a predetermined potential is input. Here, the predetermined potential is a ground potential, for example.

Note that FIG. 1B illustrates the example in which the diode D is used for rectification and the capacitor C is used for smoothing; this embodiment is not limited to using these components.

The conversion circuit 105 has two operations corresponding to the on state and the off state of the transistor Tr. The conversion circuit 105 steps up the input voltage $V_{in}$ by alternately repeating the two operations.

First, when the transistor Tr is on, the inductor L generates electromotive force in accordance with current flowing therethrough. The current value is determined by the input voltage $V_{in}$.

Then, when the transistor Tr is off, the inductor L generates reverse electromotive force so as to maintain the current. The input voltage $V_{in}$ is added to the electromotive force generated at this time, and $V_{out}$ becomes $\alpha V_{in}$.

Here, $\alpha$ is determined by the ratio of an on-state period to one switching cycle (an on-state period $T_{on}$+an off-state period $T_{off}$) of the transistor Tr, that is, by a duty ratio D ($=T_{on}/(T_{on}+T_{off})$, where $0<D<1$). In the case of using the step-up circuit, the input voltage $V_{in}$ is stepped up with $\alpha=1/(1-D)>1$.

Then, the output voltage $V_{out}$ of the conversion circuit 105 is fed back to the control circuit 107. In the case where a feedback voltage $V_{FB}$ is higher than a desired level, the control circuit 107 decreases the duty ratio D of the pulse signal. On the other hand, in the case where the feedback voltage $V_{FB}$ is lower than a desired level, the control circuit 107 increases the duty ratio D of the pulse signal.

Then, the transistor Tr controls the current flowing through the inductor L in accordance with the duty ratio D of the pulse signal input from the control circuit 107, and converts the input voltage $V_{in}$ into the voltage with another level to generate the output voltage $V_{out}$.

By feeding back the output voltage $V_{out}$ the control circuit 107 in such a manner, the output voltage $V_{out}$ can be closer to a desired level. DC-DC conversion can be performed in this manner.

Similarly, in the case of using the step-down circuit in FIG. 1C, the transistor Tr is controlled in accordance with the duty ratio D ($0<D<1$) of the pulse signal of the control circuit 107, and $V_{out}$ becomes $\alpha V_{in}$. In the case of using the step-down circuit, the input voltage $V_{in}$ is stepped down with $0<\alpha=D<1$.

As the transistor Tr, a thin film transistor, a power MOSFET, or the like can be used, and a p-channel transistor or an n-channel transistor can be used as appropriate. The transistor Tr may have a top-gate structure or a bottom-gate structure. Moreover, the transistor Tr may have a channel-etch structure or a channel-stop structure. For a semiconductor material of the transistor Tr, a silicon semiconductor such as silicon or silicon germanium, an oxide semiconductor, an organic semiconductor, a compound semiconductor, or the like can be used. Alternatively, an amorphous semiconductor, a polycrystalline semiconductor, a microcrystalline semiconductor, a single crystal semiconductor, or the like can be used.

Figure 1D:
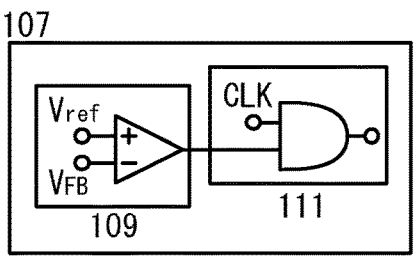

Next, a specific structure and operation of the control circuit 107 will be described. FIG. 1D illustrates an example of the control circuit 107.

The control circuit 107 includes a comparison circuit 109 and a logic circuit 111. FIG. 1D illustrates an example where a comparator is used as the comparison circuit 109 and an AND circuit is used as the logic circuit 111; alternatively, any of other comparison circuits and logic circuits can be used without limitation to this example.

As described above, the feedback voltage $V_{FB}$ from the conversion circuit 105 is input to the comparison circuit 109. The comparison circuit 109 compares the feedback voltage $V_{FB}$ and a reference voltage $V_{ref}$, and outputs a positive voltage (also referred to as an H voltage or $V_H$) or a negative voltage (also referred to as an L voltage or $V_L$).

The output voltage of the comparison circuit 109 and a clock signal CLK of the microprocessor 103 are input to the logic circuit 111. The logic circuit 111 performs arithmetic operation of these two signals, generates a pulse signal with a desired duty ratio D, and outputs the pulse signal to the gate of the transistor Tr. The on/off state of the transistor Tr is controlled in accordance with the duty ratio D of the pulse signal. Such control is called hysteresis control.

This embodiment features the use of the clock signal CLK of the microprocessor 103. By using the clock signal CLK, the duty ratio D can be controlled with extreme accuracy. In other words, the output voltage $V_{out}$ of the conversion circuit 105 can be stable, and the reliability of the DC-DC converter circuit 101 can be improved. Moreover, the microprocessor 103 can be used also by a circuit other than the DC-DC converter circuit 101; thus, production cost can be reduced.

In particular, the use of the clock signal CLK is extremely effective in the case of using the step-up circuit illustrated in FIG. 1B because it is theoretically difficult to obtain a desired duty ratio D in the comparison circuit 109.

Figure 2A:
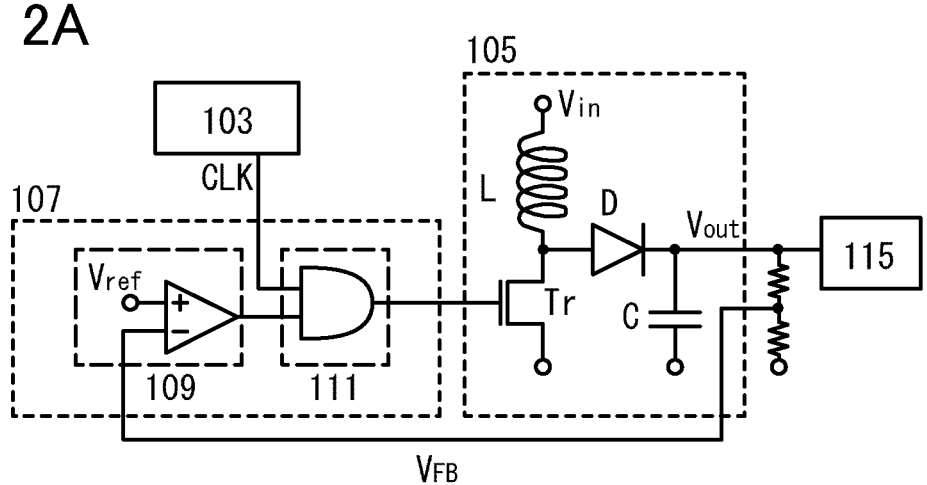
FIG. 2A illustrates an example of a semiconductor device.

Next, a specific example of generation of a pulse signal in the control circuit 107 will be described. FIG. 2A illustrates a structure of a DC-DC converter circuit in which the circuit in FIG. 1B is used as the conversion circuit 105 and the circuit in FIG. 1D is used as the control circuit 107. That is, the circuit in FIG. 2A is a step-up DC-DC converter circuit.

Figure 2B:
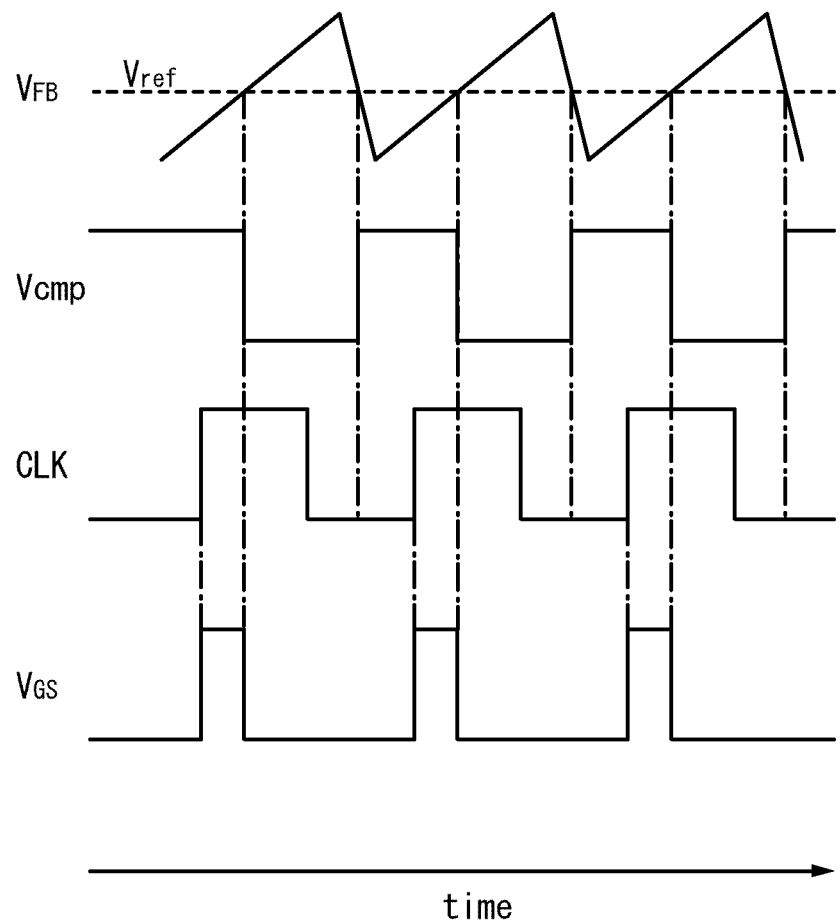
FIG. 2B illustrates an example of a timing chart.

FIG. 2B is a timing chart. The timing chart in FIG. 2B shows the feedback voltage $V_{FB}$ from the conversion circuit 105, an output voltage $V_{cmp}$ of the comparison circuit 109, the clock signal CLK of the microprocessor 103, and an output voltage $V_{is}$ of the logic circuit 111 (also referred to as an output voltage of the control circuit 107 or a gate voltage of the transistor Tr).

Here, the case where the feedback voltage $V_{FB}$ has a sawtooth wave is described. The comparison circuit 109 compares the inputted feedback voltage $V_{FB}$ and a reference voltage $V_{ref}$. When $V_{FB} > V_{ref}$, the output voltage $V_{cmp}$ becomes $V_L$. On the other hand, when $V_{ref} > V_{FB}$, the output voltage $V_{cmp}$ becomes $V_H$.

Then, the logic circuit 111 performs arithmetic operation of the inputted output voltage $V_{cmp}$ and the clock signal CLK of the microprocessor 103. An AND circuit is used as the logic circuit 111 in this embodiment; therefore, the output voltage $V_{is}$ is $V_H$ when both of the two signals are $V_H$ and is $V_L$ in any other case.

In such a manner, the duty ratio D of the pulse signal is determined in accordance with the level of the output voltage $V_{is}$. Moreover, the on/off state of the transistor Tr is controlled in accordance with the duty ratio D, and DC-DC conversion is performed. A load 115 is driven in response to the converted output voltage $V_{out}$.

This embodiment can be implemented in combination with any of the other embodiments as appropriate.

Embodiment 2

In this embodiment, examples of a structure and a driving method of a semiconductor device will be described.

Figure 3A:
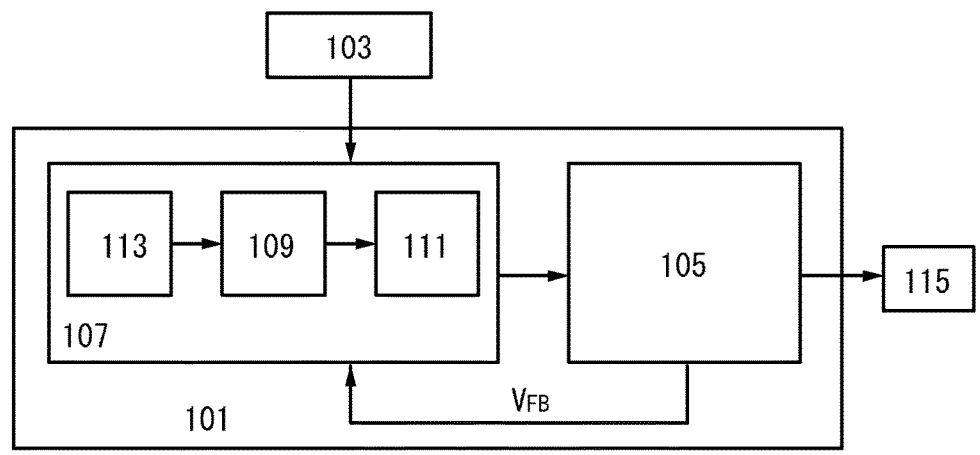
FIGS. 3A and 3B illustrate an example of a semiconductor device.

FIG. 3A is an example of a block diagram of a semiconductor device including a DC-DC converter circuit.

The semiconductor device in FIG. 3A has a structure where an amplification circuit 113 is additionally provided in the structure of FIG. 1A. Except for the amplification circuit 113, FIGS. 1B to 1D can be employed.

Figure 3B:
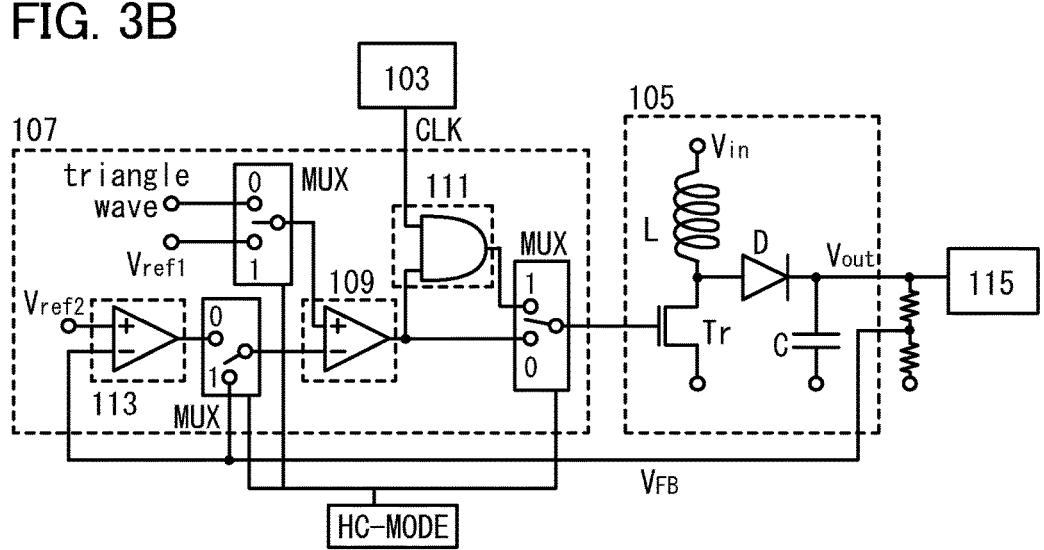

FIG. 3B illustrates a specific circuit structure. A feature of this embodiment is that the feedback voltage $V_{FB}$ from the conversion circuit 105 is input to one of the comparison circuit 109 and the amplification circuit 113 in the control circuit 107. Therefore, the control circuit 107 performs two operations (a first operation and a second operation). The two operations are switched and selected by a multiplexer MUX and an external signal HC-MODE for controlling the multiplexer MUX.

Figure 4A:
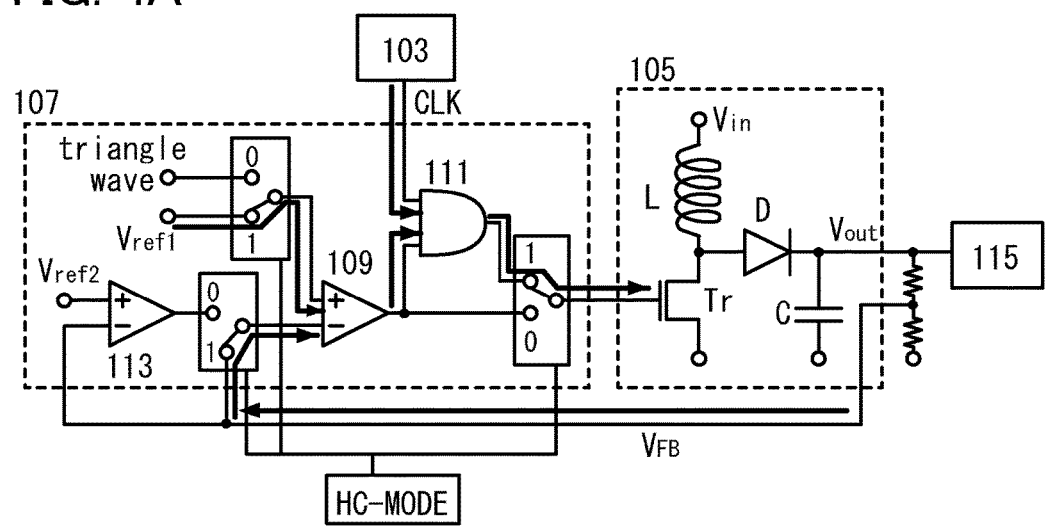
FIGS. 4A and 4B illustrate an example of a semiconductor device.

Arrows in FIG. 4A represent the case where the first operation is selected by control of the multiplexer MUX. The control with the first operation is hysteresis operation shown in Embodiment 1. That is, the feedback voltage $V_{FB}$ is input to the comparison circuit 109. The comparison circuit 109 compares the feedback voltage $V_{FB}$ and a reference voltage $V_{ref1}$. The logic circuit 111 performs arithmetic operation of the output voltage of the comparison circuit 109 and the clock signal CLK of the microprocessor 103. The output voltage of the logic circuit 111 controls the on/off state of the transistor Tr.

Figure 4B:
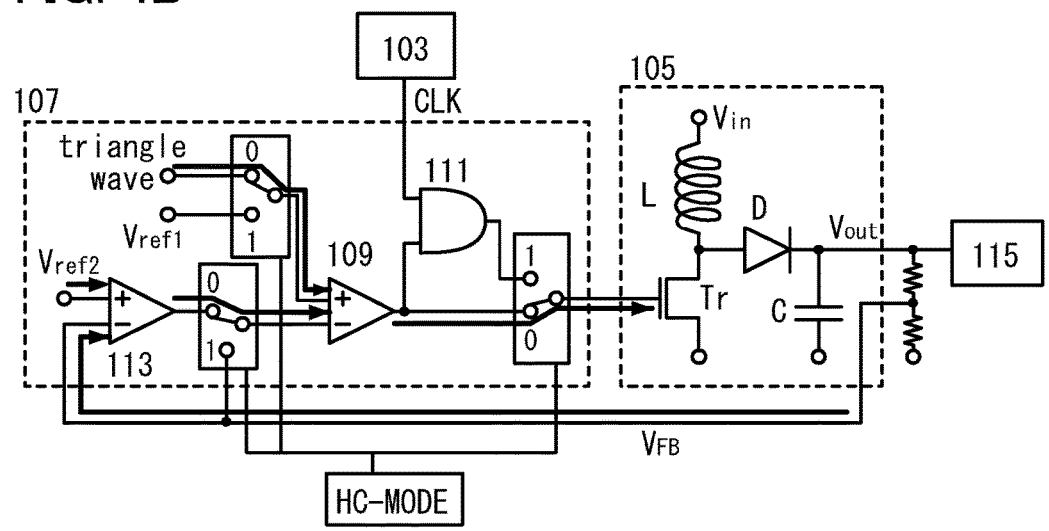

Arrows in FIG. 4B represent the case where the second operation is selected by control of the multiplexer MUX. In the second operation, the feedback voltage $V_{FB}$ is input to the amplification circuit 113. The amplification circuit 113 amplifies a difference between the feedback voltage $V_{FB}$ and a reference voltage $V_{ref2}$. The comparison circuit 109 compares the output voltage of the amplification circuit 113 and a triangle wave. The output voltage of the comparison circuit 109 controls the on/off state of the transistor Tr. As the amplification circuit 113, an error amplifier is used, for example. The control with the second operation is called PWM (pulse width modulation) control.

Next, a specific example of generation of a pulse signal in the control circuit 107 will be described. Generation of a pulse signal in the first operation is as shown in FIG. 2B.

Figure 5:
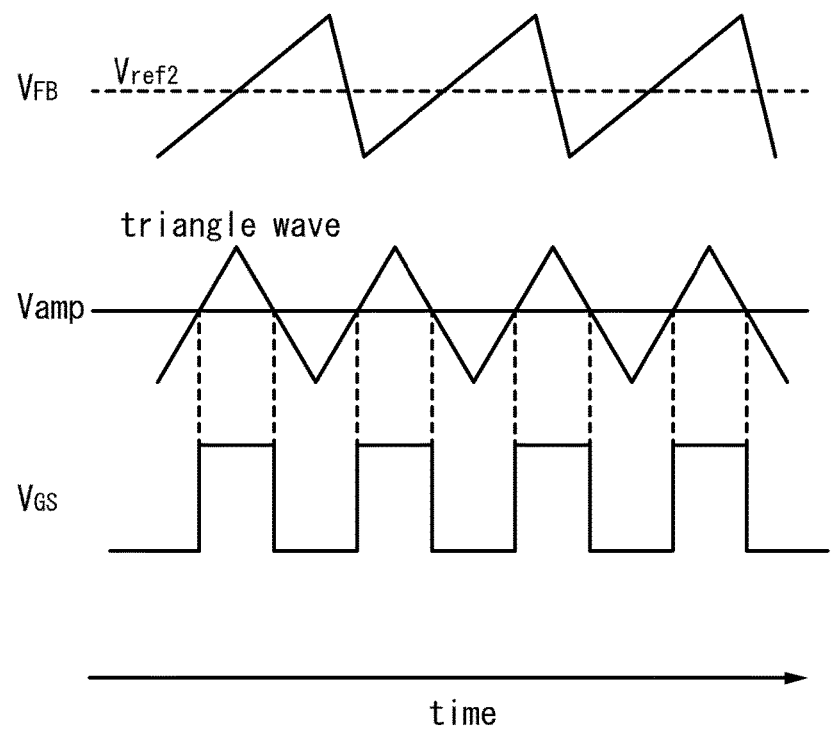
FIG. 5 illustrates an example of a timing chart.

FIG. 5 is a timing chart in the second operation. FIG. 5 shows the feedback voltage $V_{FB}$ from the conversion circuit 105, an output voltage $V_{amp}$ of the amplification circuit 113, and the output voltage $V_{is}$ of the comparison circuit 109 (also referred to as the output voltage of the control circuit 107 or the gate voltage of the transistor Tr).

Here, the case where the feedback voltage $V_{FB}$ has a sawtooth wave is described. The amplification circuit 113 amplifies a difference between the inputted feedback voltage $V_{FB}$ and the reference voltage $V_{ref2}$. Here, the output voltage $V_{amp}$ represents a steady-state voltage and corresponds to the integral of amplified differences.

Then, the comparison circuit 109 compares the inputted output voltage $V_{amp}$ and the triangle wave. When $V_{amp} >$ triangle wave, the output voltage $V_{GS}$ becomes $V_L$. On the other hand, when triangle wave $> V_{amp}$, the output voltage $V_{GS}$ becomes $V_H$.

In such a manner, the duty ratio D of the pulse signal is determined in accordance with the level of the output voltage $V_{GS}$. Moreover, the on/off state of the transistor Tr is controlled in accordance with the duty ratio D, and DC-DC conversion is performed. The load 115 is driven in response to the converted output voltage $V_{out}$.

Note that it is important to increase the power conversion efficiency of the DC-DC converter circuit 101. The power conversion efficiency n is represented as $n = P_{out}/P_{in} < 1$, where $P_{in}$ is an input power and $P_{out}$ is an output power of the DC-DC converter circuit 101. The power conversion efficiency n is increased depending on the value of the load.

In this embodiment, when the first operation is performed, the amplification circuit 113, a circuit for generating the triangle wave, and the like can be turned off, so that power consumption of the DC-DC converter circuit 101 can be reduced. A reduction in power consumption of the DC-DC converter circuit 101 ($= P_{in} - P_{out}$) can increase the power conversion efficiency n even if the load is small. In other words, the first operation is effective in the case where the load is small.

When the second operation is performed, the duty ratio D of the pulse signal of the control circuit 107 can be approximately equal to 1 (D≈1), which is larger than that in the first operation; thus, the output voltage $V_{out}$ of the DC-DC converter circuit 101 can be increased. By increasing the output voltage $V_{out}$ of the DC-DC converter circuit 101, the output power $P_{out}$ is increased in the case where the load is large, and the power conversion efficiency n can be increased. In other words, the second operation is effective in the case where the load is large.

In the semiconductor device including the DC-DC converter circuit in this embodiment, the operation is switched in accordance with the load in such a manner; thus, the power conversion efficiency n can be increased.

A microprocessor can be not only used for DC-DC conversion but have another function. For example, in a lighting device, a microprocessor may be used for sensing ambient light so that the illuminance is automatically controlled. When a device is thus provided with a sensor function or a control function using a microprocessor, a reduction in power consumption and higher functionality can be achieved at the same time. Note that this structure can also be applied to home appliances such as air conditioners and refrigerators and other various electronic devices.

This embodiment can be implemented in combination with any of the other embodiments as appropriate.

Embodiment 3

In this embodiment, a structure and a driving method of a display device will be described.

A display device in this embodiment includes the DC-DC converter circuit disclosed in this specification and a display panel (also referred to as a display portion) driven in accordance with the output voltage $V_{out}$ of the DC-DC converter circuit. The load 115 illustrated in FIG. 1A, FIG. 2A, FIGS. 3A and 3B, and FIGS. 4A and 4B corresponds to a display panel.

Figure 6A:
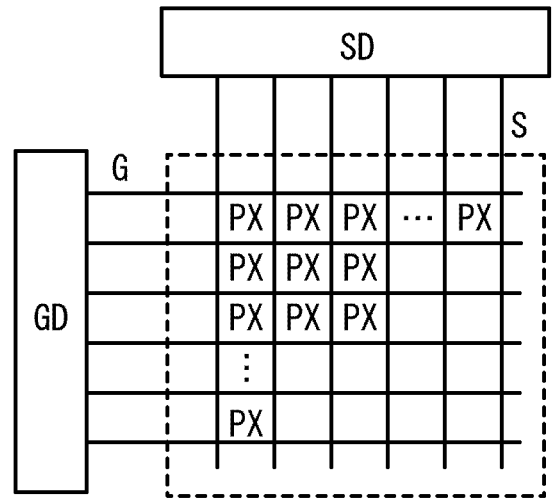
FIGS. 6A and 6B illustrate an example of a display device.

FIG. 6A illustrates an example of a display panel. The display panel includes pixels PX, and a driver circuit GD and a driver circuit SD that drive the pixels PX. The pixels PX are arranged in matrix.

Figure 6B:
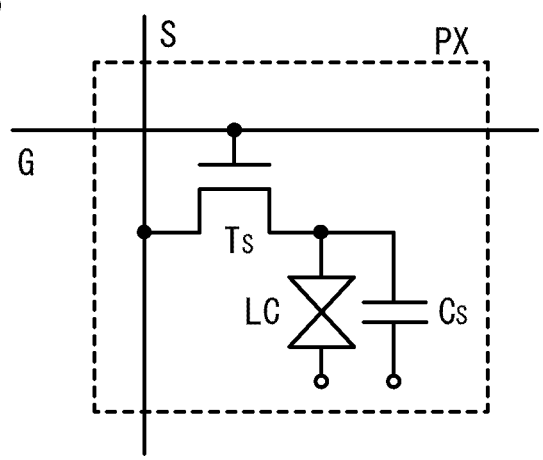

FIG. 6B illustrates an example of the pixel PX. The pixel PX includes a switching transistor Ts, a liquid crystal element LC, and a capacitor Cs. When the transistor Ts is on, a video signal is written into the liquid crystal element LC from the driver circuit SD through a wiring S, and display based on the video signal is performed. When the transistor Ts is off, the capacitor Cs holds the video signal written into the liquid crystal element LC, so that display is maintained. The on/off state of the transistor Ts is controlled with a signal input from the driver circuit GD through a wiring G Note that the pixel PX is not limited to having this structure.

The display panel in this embodiment (the load 115) features two kinds of driving (first driving and second driving).

First, in the first driving, a video signal is written into the pixel PX at intervals of 1 to 600 seconds, for example. With the first driving, writing is not performed on the pixel PX between the intervals, so that the write cycles can be reduced, leading to a reduction in power consumption. In other words, the load of the display panel is small in the first driving. Note that the first operation can be applied when pixels PX display a still image. Further, the interval may be longer than 600 seconds.

The first operation (hysteresis operation) performed in the control circuit 107 as illustrated in FIG. 4A is effective in the case where the first driving with a small load is performed. The first operation can reduce power consumption of the DC-DC converter circuit, so that the power conversion efficiency can be increased even when the load is small.

Then, in the second driving, a video signal is written into the pixel PX at intervals of 1/60 seconds or less. That is, a video signal is written into the pixel PX 60 times or more per second. Specific examples of the intervals are 1/60 seconds (60 Hz), 1/120 seconds (120 Hz), and 1/240 seconds (240 Hz). Power consumption is increased because of a large number of write cycles. In other words, the load of the display panel is large in the second driving. Note that the second operation can be applied when pixels PX display a moving image.

The second operation (PWM control) performed in the control circuit 107 as illustrated in FIG. 4B is effective in the case where the second driving with a large load is performed. Since the duty ratio D can be approximately equal to 1 (D≈1) in the second operation, the output power of the DC-DC converter circuit can be increased when the load is large, and the power conversion efficiency can be increased.

The operation of the control circuit in the DC-DC converter circuit is switched in accordance with a method for driving the display panel as described above, so that it is possible to provide a display device in which power consumption of the DC-DC converter circuit and the display panel can be reduced and the power conversion efficiency of the DC-DC converter circuit can be increased.

Next, a specific example of switching the operation (the first operation and the second operation) of the DC-DC converter circuit in accordance with the driving (the first driving and the second driving) of the display panel will be described with reference to FIGS. 4A and 4B and FIGS. 6A and 6B.

In FIGS. 4A and 4B, the microprocessor 103 performs analysis, arithmetic operation, and processing of electronic data to be displayed, and generates a video signal. Here, the case where electronic data includes still image data and moving image data and the microprocessor 103 distinguishes a still image and a moving image so that different signals (distinction signals) are output for the still image and the moving image will be described.

In the case where electronic data to be displayed is still image data, a distinction signal indicating that the image to be displayed is a still image and a video signal corresponding to the electronic data for the still image are input to the display panel. Further, in the case where electronic data is moving image data, signals are input in a similar manner. At that time, the distinction signal is also input to the DC-DC converter circuit 101 and can be used as the external signal HC-MODE for controlling the multiplexer MUX illustrated in FIGS. 4A and 4B. In such a manner, the microprocessor 103 can be used by both the DC-DC converter circuit 101 and the display panel.

Note that when a difference between successive electronic data is calculated and found to be equal to or larger than a predetermined reference value, it is judged that the data is for a moving image; whereas when the difference is smaller than the reference value, it is judged that the data is for a still image. Judgment can be made with a comparator or the like.

In the display panel, the on/off state of the transistor Ts is controlled by the driver circuit GD in accordance with a distinction signal. Moreover, the driver circuit SD performs writing on the pixel PX in accordance with a video signal. Note that a circuit for controlling the driver circuit GD and the driver circuit SD may be provided; the circuit outputs a start signal, a clock signal, and a power supply voltage to the driver circuit GD and the driver circuit SD in accordance with the distinction signal.

The first driving is applied to a still image, and a video signal is written into the pixel PX at intervals of 1 to 600 seconds. On the other hand, the second driving is applied to a moving image, and a video signal is written into the pixel PX at intervals of 1/60 seconds or less.

Further, in the DC-DC converter circuit 101, the multiplexer MUX is controlled in accordance with the distinction signal, and the first operation or the second operation is selected. When the distinction signal indicating a still image is input, the first operation in FIG. 4A is performed and the output voltage $V_{out}$ is generated. When the distinction signal indicating a moving image is input, the second operation in FIG. 4B is performed and the output voltage $V_{out}$ is generated.

As described above, the operation of the DC-DC converter circuit 101 can be switched in accordance with the amount of load of the display panel so that the DC-DC converter circuit 101 performs the first operation (hysteresis operation) when the display panel performs the first driving with a small load (displays a still image), and performs the second operation (PWM control) when the display panel performs the second driving with a large load (displays a moving image).

This embodiment can be implemented in combination with any of the other embodiments as appropriate.

Embodiment 4

In this embodiment, an example of a transistor included in a semiconductor device which is one embodiment of the disclosed invention will be described. Specifically, an example of a transistor in which a channel formation region is formed using an oxide semiconductor layer, that is, a transistor including an oxide semiconductor layer will be described.

In the transistor described in this embodiment, a channel formation region is formed using an oxide semiconductor layer. The oxide semiconductor layer is purified to be electrically intrinsic (i-type) or substantially intrinsic. Purification means the following concepts: hydrogen which is an n-type impurity is removed from an oxide semiconductor so that the oxide semiconductor contains impurities other than the main components as little as possible, and oxygen which is one of main components of an oxide semiconductor is supplied to an oxide semiconductor layer so that defects due to oxygen vacancy in the oxide semiconductor layer are reduced.

The number of carriers in the purified oxide semiconductor is very small, and the carrier concentration is less than $1\times10^{12}/cm^3$, preferably less than $1\times10^{11}/cm^3$. Here, a semiconductor with a carrier concentration lower than $1\times10^{11}/cm^3$ is called an intrinsic (i-type) semiconductor, and a semiconductor with a carrier concentration equal to or higher than $1\times10^{11}/cm^3$ and lower than $1\times10^{12}/cm^3$ is called a substantially intrinsic (substantially i-type) semiconductor.

Since the number of carriers in the oxide semiconductor is very small, the off-state current can be extremely low. For example, in a transistor including a purified oxide semiconductor layer, the off-state current at room temperature (per channel width of 1 μm) can be 1 aA/μm ($1\times10^{-18}$ A/μm) or lower, and further can be 100 zA/μm ($1\times10^{-19}$ A/μm) or lower.

The off-state current can be extremely low in a transistor in which a channel formation region is formed using an oxide semiconductor layer that is purified by the removal of hydrogen contained therein and the supply of oxygen to reduce defects due to oxygen vacancy therein. Therefore, charge stored at one of a source and a drain of the transistor can be retained for a long time.

An example of a structure and a manufacturing method of a transistor whose channel formation region is formed using an oxide semiconductor layer will be described with reference to FIGS. 7A to 7D.

FIGS. 7A to 7D are cross-sectional views illustrating an example of a structure and a manufacturing process of a transistor whose channel formation region is formed using an oxide semiconductor layer.

Figure 7A:
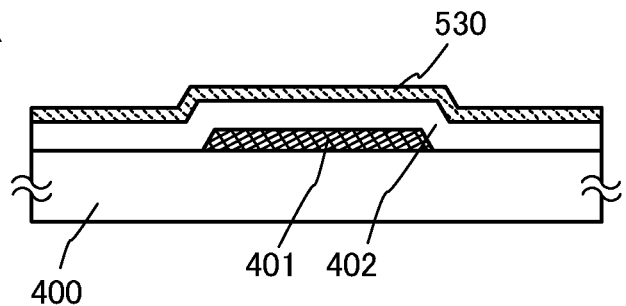
FIGS. 7A to 7D illustrate an example of a semiconductor device.
Figure 7B:
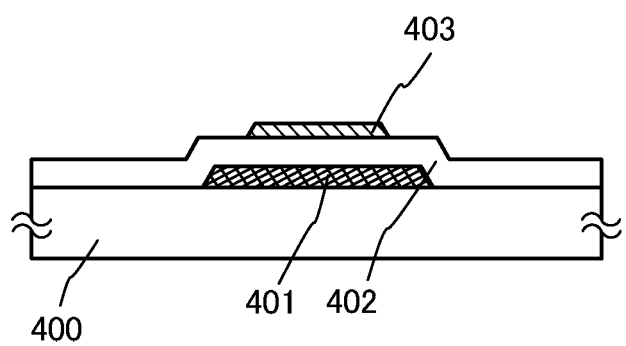
Figure 7C:
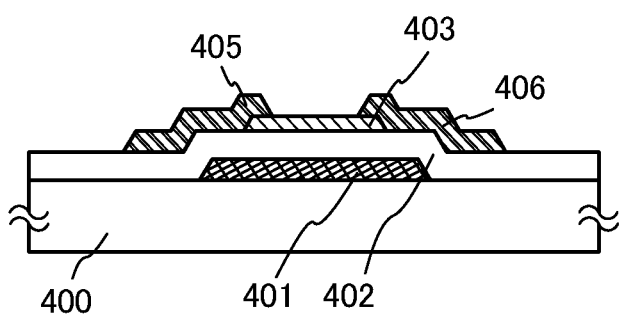
Figure 7D:
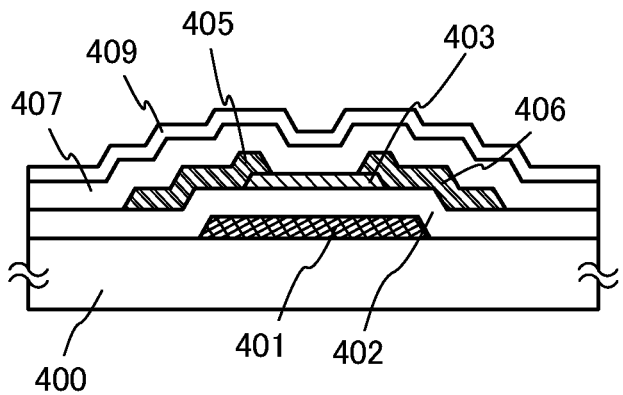

The transistor illustrated in FIG. 7D includes a conductive layer 401, an insulating layer 402, an oxide semiconductor layer 403, a conductive layer 405, and a conductive layer 406.

The conductive layer 401 is provided over a substrate 400. The insulating layer 402 is provided over the conductive layer 401. The oxide semiconductor layer 403 is provided over the conductive layer 401 with the insulating layer 402 placed therebetween. The conductive layer 405 and the conductive layer 406 are each provided over part of the oxide semiconductor layer 403.

Part of a top surface of the oxide semiconductor layer 403 (part of the oxide semiconductor layer 403 over which the conductive layer 405 and the conductive layer 406 are not provided) is in contact with an oxide insulating layer 407. A protective insulating layer 409 is provided over the oxide insulating layer 407.

The transistor illustrated in FIG. 7D has a bottom-gate type structure and is also referred to as an inverted staggered transistor. Moreover, the transistor has a channel-etch structure and a single-gate structure. However, the structure of the transistor is not limited to the above. For example, the transistor may have a top-gate structure instead of a bottom-gate structure, a channel protective structure instead of a channel-etch structure, and/or a multi-gate structure instead of a single-gate structure.

A process for manufacturing the transistor will be described below with reference to FIGS. 7A to 7D.

First, the substrate 400 is prepared, and a first conductive film is formed over the substrate 400. There is no limitation on the substrate 400 as long as it can withstand subsequent manufacturing steps. Examples of the substrate 400 are an insulating substrate such as a glass substrate, a semiconductor substrate such as a silicon substrate, a conductive substrate such as a metal substrate, and a flexible substrate such as a plastic substrate. Moreover, an insulating layer can be provided over the substrate 400. In that case, the insulating layer serves as a base that prevents diffusion of impurities from the substrate. For example, the insulating layer serving as a base can be formed with a single-layer structure or a stacked structure including two layers or more, using an insulating layer of silicon oxide, silicon oxynitride, silicon nitride, hafnium oxide, aluminum oxide, tantalum oxide, or the like. Note that it is preferable that the insulating layer contain hydrogen and water as little as possible.

Examples of the first conductive film are a film of a metal material such as molybdenum, titanium, chromium, tantalum, tungsten, aluminum, copper, neodymium, or scandium, and a film of an alloy material that contains any of the metal materials as a main component. Alternatively, the first conductive film can be a stack of layers of any of materials that can be applied to the first conductive film.

Next, a first photolithography process is carried out: a first resist mask is formed over the first conductive film, the first conductive film is selectively etched using the first resist mask to form the conductive layer 401, and the first resist mask is removed. The conductive layer 401 serves as a gate electrode of the transistor.

Then, the insulating layer 402 is formed over the conductive layer 401. The insulating layer 402 serves as a gate insulating layer of the transistor. As the insulating layer 402, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. Alternatively, the insulating layer 402 can be a stack of layers of any of the materials applicable to the insulating layer 402.

For example, the insulating layer 402 can be formed by depositing an insulating film by high-density plasma CVD. For example, high-density plasma CVD using microwaves (e.g., a frequency of 2.45 GHz) is preferable because a dense insulating film with high breakdown voltage and high quality can be deposited. When a high-quality insulating layer is formed by depositing an insulating film by high-density plasma CVD, the interface state density between the gate insulating layer and a channel formation layer of the transistor can be reduced and interface characteristics can be favorable.

Alternatively, the insulating layer 402 can be formed by sputtering, plasma CVD, or the like. Further, heat treatment may be performed after the formation of the insulating layer 402. The heat treatment can improve the quality of the insulating layer 402 and the interface characteristics between the insulating layer 402 and the oxide semiconductor.

Next, an oxide semiconductor film 530 with a thickness ranging from 2 nm to 200 nm, preferably from 5 nm to 30 nm, is formed over the insulating layer 402. For example, the oxide semiconductor film 530 can be formed by sputtering.

Note that before the formation of the oxide semiconductor film 530, powdery substances (also referred to as particles or dust) attached on a surface of the insulating layer 402 are preferably removed by reverse sputtering in which an argon gas is introduced and plasma is generated. The reverse sputtering is a method in which voltage is applied to a substrate side with the use of an RF power supply in an argon atmosphere without applying voltage to a target side and plasma is generated in the vicinity of the substrate so that a substrate surface is modified. Note that instead of an argon atmosphere, a nitrogen atmosphere, a helium atmosphere, an oxygen atmosphere, or the like may be used.

The oxide semiconductor film 530 can be formed using an In—Sn—Ga—Zn—O-based oxide semiconductor, an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, a Sn—Al—Zn—O-based oxide semiconductor, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor, an In—O-based oxide semiconductor, a Sn—O-based oxide semiconductor, a Zn—O-based oxide semiconductor, or the like. Here, an In—Ga—Zn—O-based oxide semiconductor is an oxide semiconductor containing at least In, Ga, and Zn, and there is no particular limitation on the composition ratio thereof. Further, the In—Ga—Zn—O-based oxide semiconductor may contain an element other than In, Ga, and Zn. The above oxide semiconductors can contain $SiO_2$.

Furthermore, the oxide semiconductor film 530 can be formed using an oxide semiconductor represented by the chemical formula, $InMO_3(ZnO)_m$ (m>0). Here, M denotes one or more of metal elements selected from Ga, Al, Mn, and Co. For example, M may be Ga, Ga and Al, Ga and Mn, or Ga and Co.

For example, the oxide semiconductor film 530 can be formed by sputtering with the use of an In—Ga—Zn—O-based oxide target (FIG. 7A). The atmosphere in which the oxide semiconductor film 530 is formed can be a rare gas (typically argon) atmosphere, an oxygen atmosphere, or a mixed atmosphere of a rare gas and oxygen.

As a sputtering gas used for forming the oxide semiconductor film 530, a high-purity gas from which impurities such as hydrogen, water, hydroxyl groups, or hydride are removed is preferably used, for example.

Next, a second photolithography process is carried out: a second resist mask is formed over the oxide semiconductor film 530, the oxide semiconductor film 530 is selectively etched using the second resist mask to process the oxide semiconductor film 530 into an island-shaped oxide semiconductor layer 403, and the second resist mask is removed.

For example, dry etching, wet etching, or both dry etching and wet etching can be employed for etching of the oxide semiconductor film 530.

Next, the oxide semiconductor layer is subjected to first heat treatment. With the first heat treatment, dehydration or dehydrogenation of the oxide semiconductor layer can be conducted. The temperature of the first heat treatment is equal to or higher than 400° C. and lower than the strain point of the substrate (see FIG. 7B).

A heat treatment apparatus used for the heat treatment is not limited to an electric furnace and may be an apparatus for heating an object by heat conduction or heat radiation from a heating element such as a resistance heating element. For example, an RTA (rapid thermal annealing) apparatus such as a GRTA (gas rapid thermal annealing) apparatus or an LRTA (lamp rapid thermal annealing) apparatus can be used as the heat treatment apparatus. An LRTA apparatus is an apparatus for heating an object by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. An example of the high-temperature gas is an inert gas that does not react with an object by heat treatment, such as nitrogen or a rare gas like argon.

For example, as the first heat treatment, GRTA may be performed in the following manner: the substrate is transferred to an inert gas that has been heated to a high temperature of 650° C. to 700° C., heated for several minutes, and transferred from the heated inert gas.

In addition, after the first heat treatment is performed on the oxide semiconductor layer with an electric furnace, a high-purity oxygen gas or $N_2O$ gas of 6N purity or higher (preferably 7N purity or higher) may be introduced into the same electric furnace while the temperature is maintained or decreased from the heat treatment temperature. In that case, it is preferable that the oxygen gas or the $N_2O$ gas do not contain water, hydrogen, and the like. By the effect of the oxygen gas or the $N_2O$ gas, oxygen that has been reduced through the step of eliminating impurities by the dehydration or dehydrogenation treatment is supplied; thus, the oxide semiconductor layer 403 can be purified.

Next, a second conductive film is formed over the insulating layer 402 and the oxide semiconductor layer 403.

As the second conductive film, a film of a metal material such as aluminum, chromium, copper, tantalum, titanium, molybdenum, or tungsten or an alloy material that contains any of the metal materials as a main component can be used, for example.

Alternatively, a layer containing a conductive metal oxide can be used as the second conductive film. Examples of the conductive metal oxide are indium oxide ($In_2O_3$), tin oxide ($SnO_2$), zinc oxide (ZnO), an alloy of indium oxide and tin oxide ($In_2O_3$—$SnO_2$, referred to as ITO), an alloy of indium oxide and zinc oxide ($In_2O_3$—ZnO), and such a metal oxide material containing silicon oxide.

The second conductive film may be formed by stacking films applicable to the second conductive film.

Then, a third photolithography process is carried out: a third resist mask is formed over the second conductive film, the second conductive film is selectively etched with the use of the third resist mask to form the conductive layers 405 and 406, and the third resist mask is removed (see FIG. 7C). The conductive layers 405 and 406 each serve as a source electrode or a drain electrode of the transistor.

Next, the oxide insulating layer 407 is formed over the oxide semiconductor layer 403, the conductive layer 405, and the conductive layer 406. At this time, the oxide insulating layer 407 is formed in contact with part of the top surface of the oxide semiconductor layer 403.

The oxide insulating layer 407 can be formed to a thickness of at least 1 nm using a method by which an impurity such as water or hydrogen is not introduced into the oxide insulating layer 407, such as sputtering. If hydrogen is mixed into the oxide insulating layer 407, entry of hydrogen to the oxide semiconductor layer or extraction of oxygen in the oxide semiconductor layer by hydrogen might cause the backchannel of the oxide semiconductor layer to have lower resistance (to have an n-type conductivity), so that a parasitic channel may be formed. Therefore, in order to form the oxide insulating layer 407 containing as little hydrogen as possible, it is preferable that a method in which hydrogen is not used be employed for forming the oxide insulating layer 407.

For example, a 200-nm-thick silicon oxide film can be formed as the oxide insulating layer 407 by sputtering. The substrate temperature at the time of deposition is in the range of room temperature to 300° C. Examples of the atmosphere in which the oxide insulating layer 407 is formed are a rare gas (typically argon) atmosphere, an oxygen atmosphere, and a mixed atmosphere of a rare gas and oxygen.

As a target for forming the oxide insulating layer 407, a silicon oxide target or a silicon target can be used, for example. As a sputtering gas used for forming the oxide semiconductor layer 407, a high-purity gas from which impurities such as water, hydroxyl groups, or hydride are removed is preferably used, for example.

Before the oxide insulating layer 407 is formed, plasma treatment with the use of a gas of $N_2O$, $N_2$, Ar, or the like may be performed to remove water or the like adsorbed on an exposed surface of the oxide semiconductor layer 403. In the case where plasma treatment is performed, the oxide insulating layer 407 that is in contact with part of the top surface of the oxide semiconductor layer 403 is preferably formed without exposure to the air.

Moreover, after the oxide insulating layer 407 is formed, second heat treatment (preferably at temperatures in the range of 200° C. to 400° C., for example, in the range of 250° C. to 350° C.) can be performed in an inert gas atmosphere or an oxygen gas atmosphere. For example, the second heat treatment can be performed at 250° C. for one hour in a nitrogen atmosphere. In the second heat treatment, heat is applied while part of the top surface of the oxide semiconductor layer 403 is in contact with the oxide insulating layer 407.

When a silicon oxide layer having a lot of defects is used as the oxide insulating layer 407, impurities such as hydrogen, moisture, hydroxyl groups, or hydride contained in the oxide semiconductor layer 403 are diffused into the oxide insulating layer 407 with heat treatment performed after formation of the silicon oxide layer, so that the impurities contained in the oxide semiconductor layer can be further reduced. Note that a doping process using oxygen or halogen (e.g., fluorine or chlorine) may be performed after the second heat treatment. For the doping process, plasma doping with inductively coupled plasma is preferably employed. With the doping process, hydrogen in the oxide semiconductor layer 403 is extracted by oxygen or halogen and removed. Further, the doping process can produce a similar effect when performed before the second heat treatment, before formation of the oxide insulating layer 407, before formation of the conductive layers 405 and 406, before the first heat treatment, or before formation of the oxide semiconductor layer 403. In addition, when doping is performed with high-density plasma generated using microwaves (e.g., a frequency of 2.45 GHz), the interface state density between the oxide semiconductor layer 403 and the insulating layer 402 can be reduced and interface characteristics can be favorable.

The protective insulating layer 409 may be further formed over the oxide insulating layer 407. As the protective insulating layer 409, an inorganic insulating layer such as a silicon nitride layer, an aluminum nitride layer, a silicon nitride oxide layer, or an aluminum nitride oxide layer can be used, for example. Alternatively, the protective insulating layer 409 can be a stack of layers of any of the materials applicable to the protective insulating layer 409. For example, the protective insulating layer 409 can be formed by RF sputtering. RF sputtering is preferably used as a film formation method of the protective insulating layer 409 because of its high productivity.

After the protective insulating layer 409 is formed, heat treatment may be further performed at 100° C. and 200° C. for 1 hour to 30 hours in the air. This heat treatment may be performed at a fixed heating temperature. Alternatively, the following change in the heating temperature may be conducted plural times repeatedly: the heating temperature is increased from a room temperature to a temperature of 100° C. to 200° C. and then decreased to a room temperature.

Through the above steps, impurities such as hydrogen, moisture, hydroxyl groups, or hydride (also referred to as a hydrogen compound) can be removed from the oxide semiconductor layer, and in addition, oxygen can be supplied to the oxide semiconductor layer. Accordingly, the oxide semiconductor layer can be purified. The transistor including the purified oxide semiconductor layer is manufactured through the above process.

Note that the structure of the transistor is not limited to that illustrated in FIG. 7D. The transistor in FIG. 7D has a bottom-gate structure, a channel-etch structure, and a single-gate structure. Alternatively, the transistor may have a top-gate structure. Moreover, the transistor may have a channel protective structure instead of a channel-etch structure and/or a multi-gate structure instead of a single-gate structure. Even when the transistor has a different structure, layers included in the transistor can be formed using the methods for forming the layers in the transistor in FIG. 7D as appropriate.

The transistor including the purified oxide semiconductor layer in this embodiment was subjected to a bias temperature test (BT test) at 85° C. with $2\times10^6$ V/cm for 12 hours. As a result, electrical characteristics of the transistor hardly changed, which suggested that the transistor has stable electrical characteristics.

The carrier concentration of the purified oxide semiconductor layer in this embodiment can be lower than $1\times10^{12}/$cm$^3$ and still lower than $1\times10^{11}/$cm$^3$; thus, change in characteristics due to temperature variation can be suppressed.

The transistor including the purified oxide semiconductor layer in this embodiment has electrical characteristics of much lower off-state current than a transistor including silicon or the like. For example, in the transistor including the purified oxide semiconductor layer, the off-state current at room temperature (per channel width of 1 μm) can be 1 aA/μm ($1\times10^{-18}$ A/μm) or lower, and further can be 100 zA/μm ($1\times10^{-19}$ A/μm) or lower.

In the transistor including the purified oxide semiconductor layer in this embodiment, the off-state current does not exceed the above-described limit even when the temperature changes. For example, the off-state current of the transistor can be 100 zA/μm or lower even when the temperature of the transistor is 150° C.

As has been described, the off-state current can be extremely low in the transistor in which a channel formation region is formed using the purified oxide semiconductor layer. Therefore, charge stored at one of a source and a drain of the transistor can be retained for a long time.

For example, when the above transistor is used as the transistor Ts in the pixel PX in FIG. 6B, variation in display state of the pixel due to the off-state current of the transistor Ts can be suppressed; thus, a retention period of a unit pixel corresponding to one write operation of a video signal can be made longer. Therefore, the interval between write operations of video signals can be prolonged. For example, the interval between write operations of video signals can be 1 second or longer, preferably 60 seconds or longer, further preferably 600 seconds or longer. In addition, when a video signal is not written, a circuit that operates at the time of writing a video signal can be stopped; thus, power consumption can be further reduced as the interval between write operations of video signals is longer. In other words, the load of the display panel can be reduced.

Furthermore, when the above transistor is used as the transistor Tr in the DC-DC converter circuit 101 in FIG. 1A and the like, the off-state current can be extremely low, so that the output voltage of the DC-DC converter circuit 101 can be stable. That is, the reliability of the DC-DC converter circuit 101 can be improved.

This embodiment can be implemented in combination with any of the other embodiments as appropriate.

EXPLANATION OF REFERENCES

101: DC-DC converter circuit, 103: microprocessor, 105: conversion circuit, 107: control circuit, 109: comparison circuit, 111: logic circuit, 113: amplification circuit, 115: load, 400: substrate, 401: conductive layer, 402: insulating layer, 403: oxide semiconductor layer, 405: conductive layer, 406: conductive layer, 407: oxide insulating layer, 409: protective insulating layer, 530: oxide semiconductor film This application is based on Japanese Patent Application serial No. 2010-116934 filed with Japan Patent Office on May 21, 2010, the entire contents of which are hereby incorporated by reference.

The invention claimed is:

1. A semiconductor device comprising:
   a display panel;
   a driver circuit configured to drive the display panel;
   a microprocessor configured to distinguish still image data and moving image data contained in electronic data to be displayed by the display panel; and
   a DC-DC converter circuit electrically connected to the driver circuit and comprising:
      a conversion circuit comprising:
         an inductor; and
         a transistor comprising a drain terminal and a source terminal, one of which is connected to the inductor;
      a comparison circuit comprising an input terminal electrically connected to an output terminal of the conversion circuit so that a voltage applied to the input terminal can be proportional to a voltage of the output terminal of the conversion circuit, the output terminal being configured to output an output voltage of the DC-DC converter circuit; and
      a logic circuit configured to perform an arithmetic operation and comprising a first input terminal electrically connected to an output terminal of the comparison circuit, a second input terminal electrically connected to an output of the microprocessor, and an output terminal electrically connected to a gate of the transistor so that a current output by the logic circuit can be input to the gate of the transistor, the logic circuit being an AND circuit,
   wherein the semiconductor device is configured to input a clock signal to the second input terminal of the logic circuit, and
   wherein the display panel is configured to control the DC-DC converter circuit to perform a hysteresis control when still image data are to be displayed and a pulse width modulation control when moving image data are to be displayed.

2. A display device comprising:
   a display panel;
   a driver circuit configured to drive the display panel;
   a microprocessor configured to distinguish still image data and moving image data contained in electronic data to be displayed by the display panel; and
   a DC-DC converter circuit electrically connected to the driver circuit and to an output of the microprocessor, the DC-DC converter circuit comprising:
      a conversion circuit;
      a comparison circuit comprising an input terminal electrically connected to an output terminal of the conversion circuit, the output terminal being configured to output an output voltage of the DC-DC converter circuit; and
      a logic circuit configured to perform an arithmetic operation and comprising a first input terminal electrically connected to an output terminal of the comparison circuit and a second input terminal, the logic circuit being an AND circuit,
   wherein an output terminal of the logic circuit is electrically connectable to an input terminal of the conversion circuit, wherein the microprocessor is configured to output a clock signal to the second input terminal of the logic circuit, wherein the display panel is configured to be driven in accordance with an output voltage of the DC-DC converter circuit, wherein the display panel is configured to control the DC-DC converter circuit to perform a hysteresis control when still image data are to be displayed and a pulse width modulation control when moving image data are to be displayed, and wherein the display device is configured to connect the output terminal of the logic circuit to the input terminal of the conversion circuit when performing the hysteresis control.

3. A semiconductor device comprising:

a display panel;

a driver circuit configured to drive the display panel, and a DC-DC converter circuit, the DC-DC converter circuit comprising:

a conversion circuit comprising:

an inductor; and a transistor comprising a drain terminal and a source terminal, one of which is connected to the inductor;

an amplification circuit electrically connected to an output terminal of the conversion circuit;

a first multiplexer comprising a first input terminal electrically connected to the output terminal of the conversion circuit so that a voltage applied to the first input terminal can be proportional to a voltage of the output terminal of the conversion circuit, and a second input terminal electrically connected to an output terminal of the amplification circuit;

a comparison circuit comprising an input terminal electrically connected to an output terminal of the first multiplexer;

a logic circuit configured to perform an arithmetic operation and comprising a first input terminal electrically connected to an output terminal of the comparison circuit and a second input terminal, the logic circuit being an AND circuit; and a second multiplexer comprising a first input terminal electrically connected to an output terminal of the logic circuit, a second input terminal electrically connected to an output terminal of the comparison circuit, and an output terminal electrically connected to a gate of the transistor, and a microprocessor configured to output a clock signal to the second input terminal of the logic circuit, wherein a current output by the logic circuit can be input to the gate of the transistor via the second multiplexer, wherein the microprocessor is configured to distinguish still image data and moving image data contained in electronic data to be displayed by the display panel, and wherein the display panel is configured to control the DC-DC converter circuit to perform a hysteresis control when still image data are to be displayed and a pulse width modulation control when moving image data are to be displayed.

4. A semiconductor device according to claim 1, wherein the microprocessor is configured to output the clock signal to the second input terminal of the logic circuit.

5. A semiconductor device according to claim 1,
wherein the semiconductor device is a display device comprising a second transistor in a pixel, the second transistor comprising an oxide semiconductor layer.

6. A display device according to claim 2, further comprising a transistor in a pixel, the transistor comprising an oxide semiconductor layer.

7. A display device according to claim 2, further comprising a transistor in a pixel, the transistor comprising an oxide semiconductor layer.

8. A semiconductor device according to claim 1, further comprising a load electrically connected to an output of the DC-DC converter circuit, wherein the input terminal of the comparison circuit is electrically connected to the output terminal of the conversion circuit in accordance with a signal input into the load.

9. A semiconductor device according to claim 3, wherein a third input terminal of the first multiplexer and a third input terminal of the second multiplexer are connected to a control wiring.

10. A semiconductor device according to claim 1, wherein a multiplexer is interposed between the output terminal of the logic circuit and the gate of the transistor.

11. A semiconductor device according to claim 1, wherein a multiplexer is interposed between the input terminal of the comparison circuit and the output terminal of the conversion circuit.

12. A semiconductor device according to claim 1, wherein the comparison circuit is configured to compare an output of the conversion circuit with a reference signal;

wherein the logic circuit is configured to perform the arithmetic operation between an output of the comparison circuit and the clock signal; and wherein in the conversion circuit, the transistor is configured to control a current flowing through the inductor in accordance with an output of the logic circuit, and the output of the conversion circuit is generated in accordance with the current flowing through the inductor.

13. A semiconductor device according to claim 3, wherein the semiconductor device is configured to perform one of a first operation and a second operation, in which in the first operation, the comparison circuit compares an output of the conversion circuit with a first reference signal and the logic circuit performs the arithmetic operation between an output of the comparison circuit and the clock signal, and in the second operation, the amplification circuit amplifies a difference between the output of the conversion circuit and a second reference signal and the comparison circuit compares an output of the amplification circuit with a triangle wave signal; and wherein in the conversion circuit, the transistor is configured to control a current flowing through the inductor in accordance with an output of the logic circuit through the first operation or an output of the comparison circuit through the second operation, and the output of the conversion circuit is generated in accordance with the current flowing through the inductor.

14. A semiconductor device according to claim 3, wherein the microprocessor is configured to control the first multiplexer in accordance with electronic data to be displayed by the display panel.

* * * * *